United States Patent
Haydock

(10) Patent No.: US 12,535,229 B2
(45) Date of Patent: Jan. 27, 2026

(54) FURNACE MONITORING AND CONTROL BASED ON RATE OF FLUE GAS TEMPERATURE CHANGE

(71) Applicant: CARRIER CORPORATION, Palm Beach Gardens, FL (US)

(72) Inventor: Paul M. Haydock, Zionsville, IN (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 882 days.

(21) Appl. No.: 17/718,499

(22) Filed: Apr. 12, 2022

(65) Prior Publication Data

US 2022/0341601 A1    Oct. 27, 2022

Related U.S. Application Data

(60) Provisional application No. 63/177,512, filed on Apr. 21, 2021.

(51) Int. Cl.
*F24D 19/10* (2006.01)
*F23N 5/24* (2006.01)

(52) U.S. Cl.
CPC ......... *F24D 19/1084* (2013.01); *F23N 5/242* (2013.01); *F23N 2225/10* (2020.01); *F24D 2200/04* (2013.01)

(58) Field of Classification Search
CPC .. F23N 5/242; F23N 2225/10; F24D 19/1084; F24D 2200/04
USPC ...................................................... 431/180
See application file for complete search history.

(56) References Cited

U.S. PATENT DOCUMENTS

| | | | |
|---|---|---|---|
| 4,401,261 A | 8/1983 | Brown | |
| 4,688,547 A | 8/1987 | Ballard et al. | |
| 5,158,446 A * | 10/1992 | Hall | F23N 5/045 |
| | | | 122/18.31 |
| 6,880,548 B2 * | 4/2005 | Schultz | F24H 3/087 |
| | | | 126/110 R |
| 6,925,999 B2 | 8/2005 | Hugghins et al. | |
| 7,228,693 B2 | 6/2007 | Helt | |
| 2013/0108971 A1 | 5/2013 | Maiello et al. | |
| 2014/0020669 A1 * | 1/2014 | Sherrow | F24H 3/087 |
| | | | 126/110 C |

(Continued)

FOREIGN PATENT DOCUMENTS

CN    103911167 B    2/2016
CN    105403063 B    11/2017

(Continued)

*Primary Examiner* — Steven B McAllister
*Assistant Examiner* — Benjamin W Johnson
(74) *Attorney, Agent, or Firm* — Carlson, Gaskey & Olds, P.C.

(57) ABSTRACT

An illustrative example embodiment of a method of operating a furnace configured for heating a space to be occupied by at least one individual includes determining a rate of change of a flue gas temperature of a flue gas vented from the furnace, determining a difference between the determined rate of change and a predetermined acceptable rate for a current furnace operating condition, and adjusting at least one operation characteristic of the furnace based on the determined difference satisfying at least one predetermined criterion. In some situations, such as a heating cycle, the flue gas temperature is compared to maximum and minimum thresholds.

20 Claims, 2 Drawing Sheets

(56) References Cited

U.S. PATENT DOCUMENTS

| | | | |
|---|---|---|---|
| 2014/0229022 A1* | 8/2014 | Deivasigamani | ... F24D 19/1051 |
| | | | 700/282 |
| 2015/0159887 A1 | 6/2015 | Kadah et al. | |
| 2018/0259199 A1* | 9/2018 | Batson | ............... F23L 17/005 |
| 2021/0033341 A1 | 2/2021 | Fujishima | |

FOREIGN PATENT DOCUMENTS

| | | |
|---|---|---|
| CN | 109055640 B | 7/2020 |
| CN | 111578306 A | 8/2020 |
| CN | 212512523 U | 2/2021 |
| DE | 102008057697 A1 | 5/2010 |
| EP | 0604388 B1 | 3/1998 |
| KR | 100287844 B1 | 4/2001 |

* cited by examiner

FURNACE MONITORING AND CONTROL BASED ON RATE OF FLUE GAS TEMPERATURE CHANGE

CROSS REFERENCE TO RELATED APPLICATION

This application claims priority to U.S. Provisional Application No. 63/177,512, filed on Apr. 21, 2021.

BACKGROUND

Furnaces are in widespread use for heating spaces that are occupied by at least one individual. For example, furnaces for residential use typically provide heat for an entire house. Typical furnaces include a control circuit and temperature actuated switches for monitoring operating conditions of the furnace. Furnace designers typically place temperature actuated switches in specific locations on the furnace in an attempt to optimize the temperature monitoring for a variety of possible furnace installation configurations. There are various differences among furnace installations, depending on the installation site. For example, the airflow through the furnace may be upward, downward, or horizontal. Additionally, the location of the return air supply may be located near the bottom or on either side of the furnace. Such variations in furnace installation may affect the performance response of the temperature actuated switches.

SUMMARY

An illustrative example embodiment of a method of operating a furnace configured for heating a space to be occupied by at least one individual includes determining a rate of change of a flue gas temperature of a flue gas vented from the furnace, determining a difference between the determined rate of change and a predetermined acceptable rate for a current furnace operating condition, and adjusting at least one operation characteristic of the furnace based on the determined difference satisfying at least one predetermined criterion.

In an example embodiment having at least one of the features of the method of the previous paragraph, determining the rate of change of the flue gas temperature includes sensing the flue gas temperature using a temperature sensor.

In an example embodiment having at least one of the features of the method of any of the previous paragraphs, the temperature sensor is either exposed to the flue gas to directly sense the flue gas temperature or situated to sense a temperature of a portion of the furnace that is exposed to the flue gas and the temperature of the portion corresponds to the flue gas temperature.

In an example embodiment having at least one of the features of the method of any of the previous paragraphs, adjusting the at least one operation characteristic of the furnace includes at least one of reducing an input level of fuel to a burner of the furnace, increasing a fan speed of a blower of the furnace, shutting off the furnace and recycling a startup procedure, or shutting down the furnace.

In an example embodiment having at least one of the features of the method of any of the previous paragraphs, the current furnace operation condition is a startup procedure that includes turning on a burner of the furnace, the predetermined acceptable rate comprises an increase in the flue gas temperature over time, the at least one criterion includes a rate difference threshold, and when the determined rate exceeds the predetermined acceptable rate and the determined difference exceeds the rate difference threshold, adjusting the at least one operation characteristic includes at least one of reducing an input level of fuel supplied to the burner, increasing a speed of a blower fan, or shutting down the furnace.

In an example embodiment having at least one of the features of the method of any of the previous paragraphs, the current furnace operation condition is a startup procedure that includes turning on a burner of the furnace, the predetermined acceptable rate comprises an increase in the flue gas temperature over time, the at least one criterion includes a rate difference threshold, and adjusting the at least one operation characteristic includes at least temporarily shutting down the furnace followed by automatically recycling the startup procedure when the determined rate is below the predetermined acceptable rate and the determined difference exceeds the rate difference threshold.

In an example embodiment having at least one of the features of the method of any of the previous paragraphs, at least temporarily shutting down the furnace followed by automatically recycling the startup procedure comprises performing the shutting down and recycling the startup procedure up to a predetermined acceptable number of times and subsequently preventing operation of the furnace based on the determined rate remaining below the predetermined acceptable rate and the determined difference repeatedly exceeding the rate difference threshold each of the number of times.

In an example embodiment having at least one of the features of the method of any of the previous paragraphs, the current furnace operation condition is a heating cycle that includes operating a burner of the furnace; the predetermined acceptable rate comprises an increase in the flue gas temperature over time; the at least one criterion includes a rate difference threshold; and when the determined rate exceeds the predetermined acceptable rate and the determined difference exceeds the rate difference threshold, adjusting the at least one operation characteristic includes at least one of shutting down the furnace, increasing a blower fan speed, or reducing a fuel input rate to the burner.

An example embodiment having at least one of the features of the method of any of the previous paragraphs includes determining the flue gas temperature, determining whether the determined flue gas temperature is below a minimum temperature threshold or exceeds a maximum temperature threshold for the heating cycle, and shutting down the furnace based on the determined flue gas temperature exceeding the maximum temperature threshold or staying below the minimum temperature threshold.

In an example embodiment having at least one of the features of the method of any of the previous paragraphs, adjusting the at least one operation characteristic includes shutting down the furnace and the method includes providing an indication of a need for service of the furnace based on shutting down the furnace.

An example embodiment having at least one of the features of the method of any of the previous paragraphs includes providing an indication of an expected problem with at least one component of the furnace, wherein the indication of the expected problem is based on the furnace operating condition and the determined difference.

An illustrative example embodiment of a furnace configured for heating a space to be occupied by at least one individual includes a burner, a heat exchanger situated near the burner, a blower configured to direct fluid flow across the heat exchanger, a vent configured to direct flue gas away from the furnace, a temperature sensor situated to sense a temperature of the flue gas, and a controller that receives an indication of the temperature of the flue gas from the temperature sensor. The controller is configured to determine a rate of change of the flue gas, determine a difference between the determined rate of change and a predetermined acceptable rate for a current furnace operating condition, and adjust at least one operation characteristic of the furnace based on the determined difference satisfying at least one predetermined criterion.

In an example embodiment having at least one of the features of the furnace of the previous paragraph, the temperature sensor is either exposed to the flue gas to directly sense the flue gas temperature or situated to sense a temperature of a portion of a combustion exhaust housing of the furnace that is exposed to the flue gas, where the temperature of the portion corresponds to the flue gas temperature.

In an example embodiment having at least one of the features of the furnace of any of the previous paragraphs, the controller is configured to adjust the at least one operation characteristic of the furnace by at least one of reducing an input level of fuel to the burner, increasing a fan speed of the blower, shutting off the furnace and recycling a startup procedure, or shutting down the furnace.

In an example embodiment having at least one of the features of the furnace of any of the previous paragraphs, the current furnace operation condition is a startup procedure that includes turning on the burner, the predetermined acceptable rate comprises an increase in the flue gas temperature over time, the at least one criterion includes a rate difference threshold; and when the determined rate exceeds the predetermined acceptable rate and the determined difference exceeds the rate difference threshold, the controller is configured to adjust the at least one operation characteristic by at least one of reducing an input level of fuel supplied to the burner, increasing a fan speed of the blower, or shutting down the furnace.

In an example embodiment having at least one of the features of the furnace of any of the previous paragraphs, the current furnace operation condition is a startup procedure that includes turning on the burner, the predetermined acceptable rate comprises an increase in the flue gas temperature over time, the at least one criterion includes a rate difference threshold; and when the determined rate is below the predetermined acceptable rate and the determined difference exceeds the rate difference threshold, the controller is configured to adjust the at least one operation characteristic by at least temporarily shutting down the furnace followed by automatically recycling the startup procedure.

In an example embodiment having at least one of the features of the furnace of any of the previous paragraphs, the current furnace operation condition is a heating cycle that includes operating the burner, the predetermined acceptable rate comprises an increase in the flue gas temperature over time, the at least one criterion includes a rate difference threshold, and when the determined rate exceeds the predetermined acceptable rate and the determined difference exceeds the rate difference threshold, the controller is configured to adjust the at least one operation characteristic by at least one of reducing an input level of fuel supplied to the burner, increasing a fan speed of the blower, or shutting down the furnace.

In an example embodiment having at least one of the features of the furnace of any of the previous paragraphs, the controller is configured to determine the flue gas temperature based on the indication from the temperature sensor, determine whether the determined flue gas temperature is below a minimum temperature threshold or exceeds a maximum temperature threshold for the heating cycle, and shut down the furnace based on the determined flue gas temperature exceeding the maximum temperature threshold or staying below the minimum temperature threshold.

In an example embodiment having at least one feature of the furnace of any of the previous paragraphs, the controller is configured to adjust the at least one operation characteristic by shutting down the furnace and provide an indication of a need for service of the furnace based on shutting down the furnace.

In an example embodiment having at least one feature of the furnace of any of the previous paragraphs, the controller is configured to determine that there is an expected problem with at least one of the burner, the blower, or the heat exchanger based on the furnace operating condition and the determined difference; and provide an indication of the expected problem.

The various features and advantages of at least one disclosed example embodiment will become apparent to those skilled in the art from the following detailed description. The drawings that accompany the detailed description can be briefly described as follows.

DETAILED DESCRIPTION

Figure 1:
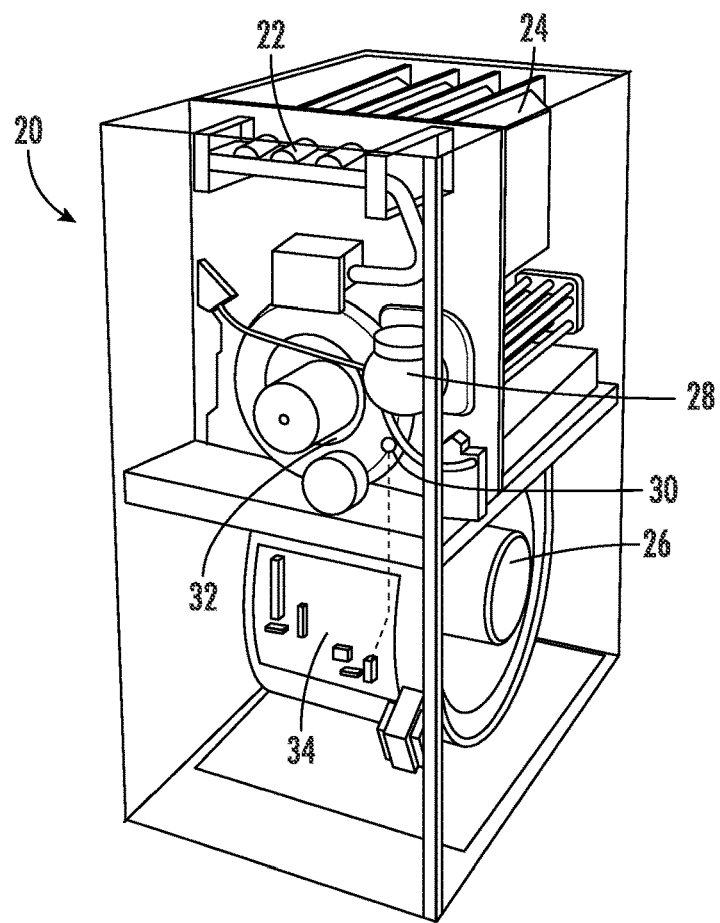
FIG. 1 illustrates selected portions of an example embodiment of a furnace including an example flue gas temperature sensor placement.

FIG. 1 illustrates a furnace 20 that is configured for heating a space that would be occupied by at least one individual. For example, the furnace 20 may be for residential use for heating an entire house or at least a portion of the house. The furnace 20 includes a burner 22 that operates in a known manner to generate heat. A heat exchanger 24 heats airflow across the heat exchanger 24 caused by a blower 26.

The furnace 20 includes a vent 28 for directing flue gas away from the furnace 20. Flue gas is the gaseous fluid in the heat exchanger and venting portions of the furnace 20. The flue gas of the furnace 20 is mostly air that, during an off-cycle of the furnace 20, replaces the burned gas exhaust that exits the vent 28 during the on-cycle of the furnace 20.

A temperature sensor 30 is situated to sense the temperature of the flue gas. The illustrated example furnace 20 includes a housing 32 that is part of an induced draft combustion exhaust blower in this embodiment. The example temperature sensor 30 in the embodiment of FIG. 1 is situated on a portion of the housing 32. The temperature sensor 30 indirectly senses the temperature of the flue gas by sensing the temperature of a portion of the housing 32 that is exposed to the flue gas. That portion of the housing 32 has a temperature that corresponds to the temperature of the flue gas even if it is not the exact same temperature as the flue gas. In such embodiments, a compensation factor may be used to determine the flue gas temperature based on the sensed temperature of the housing 32.

A controller 34 receives an indication of the flue gas temperature from the temperature sensor 30. The controller 34 is configured to monitor operation of the furnace 20 and to control operation of the furnace 20 based on information regarding the flue gas temperature.

Figure 2:
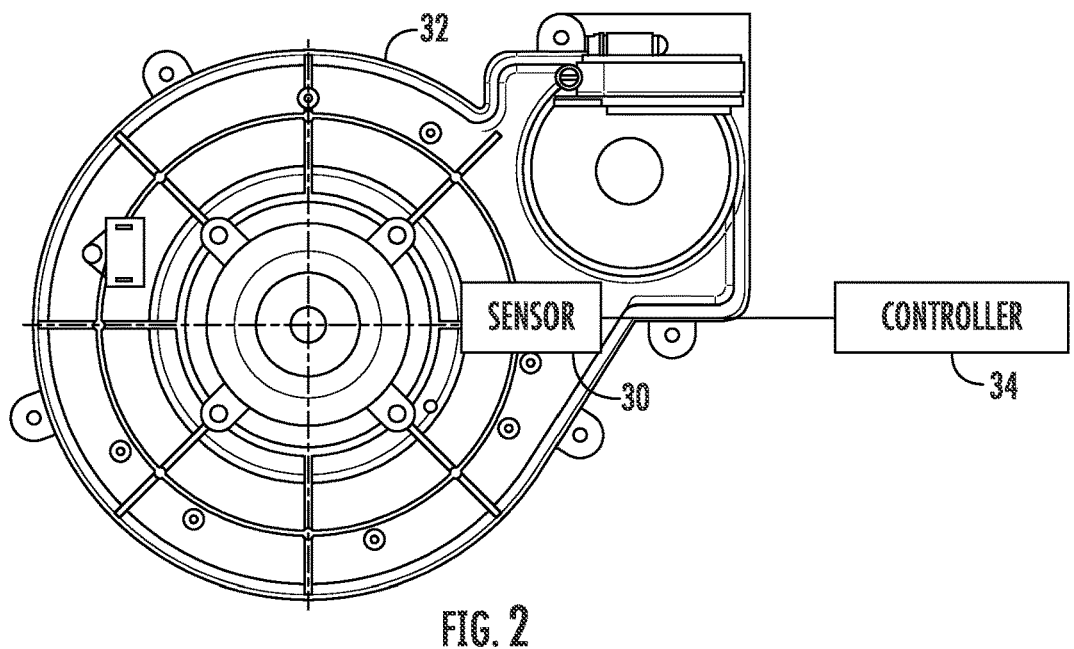
FIG. 2 schematically illustrates another example flue gas temperature sensor placement.

FIG. 2 illustrates another example arrangement of a temperature sensor 30. In this example, the temperature sensor 30 is situated within the housing 32 where the temperature sensor 30 is exposed directly to the flue gas. Such a configuration allows for directly sensing the temperature of the flue gas.

Other locations of a temperature sensor for sensing the temperature of the flue gas are used in other example embodiments. Whether the temperature sensor 30 is positioned or situated to be directly exposed to the flue gas may depend on the specific model or type of sensor and whether it is prone to contamination, for example, by being exposed directly to the flue gas.

Figure 3:
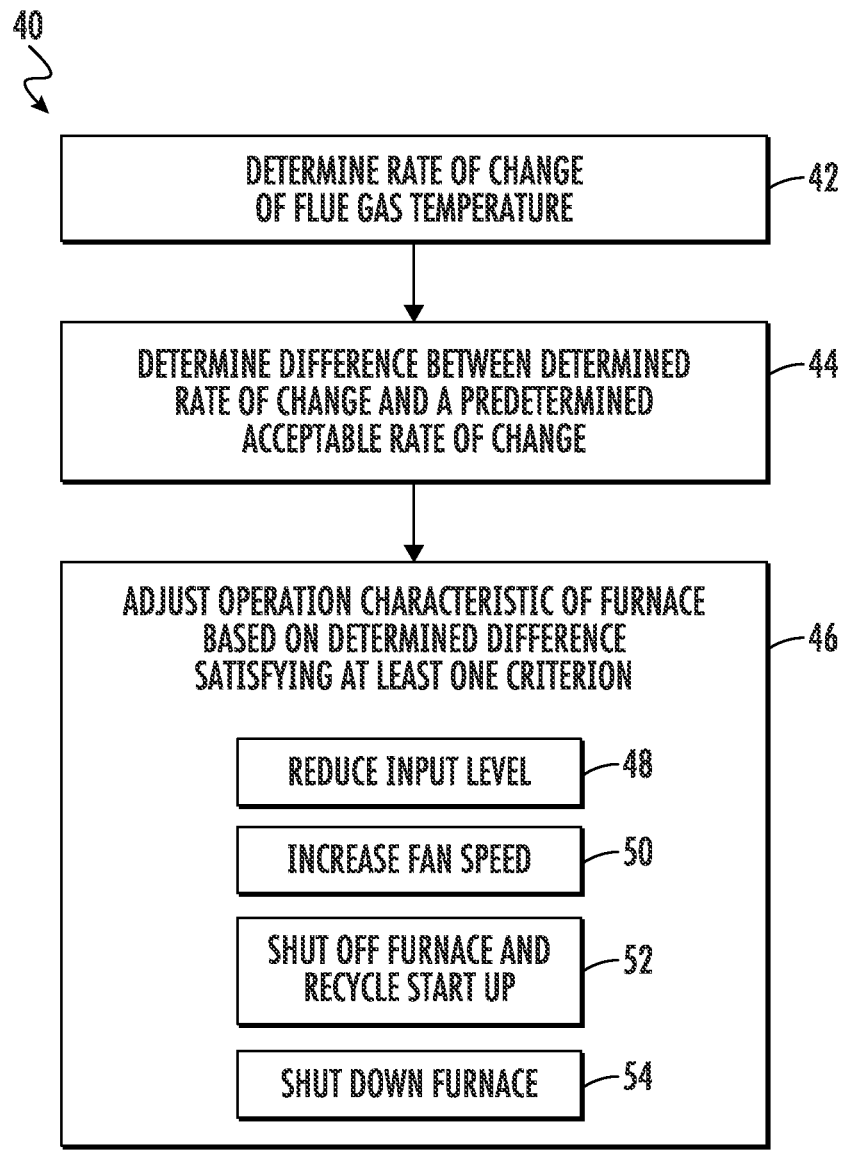
FIG. 3 is a flow chart diagram summarizing an example embodiment of a process of monitoring and controlling a furnace based on a rate of change of a flue gas temperature.

FIG. 3 includes a flow chart diagram 40 that summarizes an example approach used by the controller 34 for monitoring and controlling operation of the furnace 20. At 42, the controller 34 determines a rate of change of the flue gas temperature based on the indication from the temperature sensor 30. The rate of change of the flue gas temperature is considered as a rate over time, such as a change in a number of degrees per second, for example. At 44, the controller 34 determines a difference between the determined rate of change of the flue gas temperature and a predetermined acceptable rate of change for a current furnace operating condition. Under different operating conditions, the expected or acceptable rate of change of the flue gas temperature may vary. The controller 34 is configured to utilize an appropriate acceptable rate of change for the current operating condition. At 46, the controller 34 adjusts at least one operation characteristic of the furnace 20 based on the determined difference satisfying at least one criteria.

The example approach utilizes the manner in which a flue gas temperature is expected to change for a variety of furnace conditions to monitor and control operation of the furnace 20. For example, when external conditions are consistent, the flue gas temperature will follow a consistent pattern. Flue gas temperature and the efficiency of the furnace 20 may be affected by the volume of circulating air and the temperature of that air as it passes over the heat exchanger 24, which affects the amount of heat that is extracted from the flue gas. A change in the amount of airflow or the temperature of that air will change the flue gas temperature. For example, as the temperature of the return air drawn from the occupied space increases, the flue gas temperature increases. The amount of airflow through the furnace is affected by adjustments made during installation and the configuration or condition of supply and return registers, zone system dampers, and a furnace filter, for example. Given that the flue gas temperature is affected by such characteristics or conditions of the furnace 20 and associated components, the controller 34 is able to use information regarding the rate of change of the flue gas temperature to determine a condition or performance of the furnace 20.

As indicated at 46, the controller 34 adjusts at least one operating characteristic of the furnace 20 based on the determined difference between the determined flue gas temperature rate of change and the desired or acceptable rate of change. As schematically represented in FIG. 3, the controller 34 may adjust an operating characteristic such as reducing an input level of fuel to the burner 22 at 48, increasing a fan speed of the blower 26 at 50, shutting off the furnace 20 and recycling a startup procedure at 52, or shutting down the furnace and preventing further operation at 54. Depending on the current operating condition of the furnace 20, the controller 34 selects an appropriate adjustment to an operation characteristic of the furnace 20 to address the current situation.

For example, during a startup procedure when the furnace has been inactive and heat is desired, the startup procedure includes turning on the burner 22. During a startup procedure, there is an expected and acceptable rate of increase in the flue gas temperature over time. When there is a difference between the determined flue gas temperature rate of change and the acceptable rate that exceeds a rate difference threshold and the determined flue gas temperature rate of change exceeds the predetermined acceptable rate, adjusting the at least one operation characteristic includes at least one of reducing an input level of fuel supplied to the burner, increasing a speed of the fan of the blower 26, or shutting down the furnace 20.

An unexpectedly high rate of flue gas temperature increase during a startup procedure may be the result of an excessive fuel input rate. This can occur if an installation procedure is not performed properly. If reducing the fuel input rate does not bring the rate of change of the flue gas temperature down to a desired rate, that may indicate a problem other than an improper installation. Another possible cause of an unacceptably high rate of flue gas temperature increase may be that the blower 26 is not operating properly. If the controller 34 attempts to increase the fan speed at 50 and the rate of flue gas temperature increase does not drop to an acceptable level, that may indicate that the blower 26 is not functioning properly. When an adjustment at 48 or 50 does not resolve the issue, the controller 34 will shut down the furnace at 54.

Under such conditions, the controller 34 determines that there is a problem with the fuel input rate or the blower 26. The controller 34 generates an output to provide an indication corresponding to the determined condition, such as a fault code.

If the determined rate of flue gas temperature change during a startup procedure is below the expected or acceptable rate and the difference is greater than a rate difference threshold, the controller 34 shuts off the furnace 20 at least temporarily and recycles the startup procedure at 52. The controller 34 repeats shutting down the furnace and recycling the startup procedure a selected, predetermined number of times. If the flue gas temperature rate of increase continues to deviate from an acceptable rate, then the controller 34 shuts down the furnace at 54 and provides an indication that service is needed. The flue gas temperature rate of change may be below that which is expected when the heat exchanger 24 is at least partially blocked or the fuel input rate is too low. It may also be possible that the temperature sensor 30 is not properly positioned to be sufficiently warmed by the heat in the flue gas. An indication from the controller 34 may indicate one or all of these possible scenarios to be addressed.

In some embodiments, the controller 34 also considers the flue gas temperature as indicated by the sensor 30 without considering a rate of change in that temperature. The controller determines whether the flue gas temperature is below a minimum temperature threshold or above a maximum temperature threshold and adjusts control or operation of the furnace 20 when the flue gas temperature is outside an acceptable range for the current operating condition.

During a heating cycle, for example, the flue gas temperature should not exceed a maximum threshold for a heating cycle. If it does, the controller 34 will shut off the burner 22 and continue operating the blower 26 until the temperature indicated by the temperature sensor 30 reaches an acceptable level. The controller 34 in some embodiments tracks how many times the flue gas temperature exceeds the maximum temperature threshold. The controller 34 may prevent operation of the furnace 20 for a preset period of time or may allow the furnace 20 to run for an additional number of cycles.

For a situation in which the heating function is expected to be in operation, but the temperature sensor is below a minimum threshold, the controller 34 will shut down the furnace 20. Depending on the situation, the controller 34 will either instigate additional heat cycles or lockout the furnace 20 from attempting additional cycles. Depending on the case of exceeding or not meeting either threshold and the rate of change of the flue gas temperature, the controller 34 may operate the induced draft blower or the circulating blower 26 independently for a timeout period or until a future state of the sensor is satisfied.

At an end of a heating cycle, the controller 34 monitors the temperature of the flue gas based on an indication from the temperature sensor 30 at regular intervals. The flue gas temperature should decrease over time. The rate of decrease should be within acceptable range of a minimum rate. If so, the controller 34 proceeds with a shut down cycle and turns off the blower 26 using a normal off-delay cycle. If the rate of decrease of the flue gas temperature is not within an acceptable range of the minimum rate, the controller 34 causes the blower 26 to continue to operate until the temperature decrease threshold is met. This may occur, for example, if the burner 22 does not shut off as expected, which would continue to reduce heat in the heat exchanger 24.

One feature of the example embodiments is that using a single temperature sensor 30 for detecting the flue gas temperature makes it possible to reduce the number of sensors for monitoring furnace operation. Multiple temperature actuated switches would not be needed for many furnace configurations when flue gas temperature information is used consistent with this description. Reducing the number of switches reduces furnace cost and reduces the number of components that could require replacement or service over time.

Additionally, flue gas temperature changes will not be affected by variations in furnace installation like temperature actuated switches have been in the past. Exhausted flue gas is going to exit the vent regardless of direction of airflow into the furnace, for example. Using a flue gas temperature sensor and techniques consistent with this description, therefore, provides a more consistently reliable way to monitor and control furnace operation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of operating a furnace configured for heating a space to be occupied by at least one individual, the method comprising:
   determining a rate of change of a flue gas temperature of a flue gas vented from the furnace;
   determining a difference between a determined rate of change and a predetermined acceptable rate for a current furnace operating condition, wherein the predetermined acceptable rate comprises an increase in the flue gas temperature over time, and wherein the current furnace operating condition is a startup procedure that includes turning on a burner of the furnace;
   adjusting at least one operation characteristic of the furnace based on the determined difference satisfying at least one predetermined criterion, wherein the at least one predetermined criterion includes a rate difference threshold, and adjusting the at least one operation characteristic includes at least temporarily shutting down the furnace followed by automatically recycling the startup procedure when the determined rate is below the predetermined acceptable rate and the determined difference exceeds the rate difference threshold; and
   wherein at least temporarily shutting down the furnace followed by automatically recycling the startup procedure comprises performing the shutting down and recycling the startup procedure up to a predetermined acceptable number of times and subsequently preventing operation of the furnace based on the determined rate remaining below the predetermined acceptable rate and the determined difference repeatedly exceeding the rate difference threshold each of the number of times.

2. The method of claim 1, wherein
   the current furnace operating condition is a heating cycle that includes operating a burner of the furnace; and
   when the determined rate exceeds the predetermined acceptable rate and the determined difference exceeds the rate difference threshold, adjusting the at least one operation characteristic includes at least one of shutting down the furnace, increasing a blower fan speed, or reducing a fuel input rate to the burner.

3. The method of claim 2, wherein the method includes determining the flue gas temperature;
   determining whether the determined flue gas temperature is below a minimum temperature threshold or exceeds a maximum temperature threshold for the heating cycle; and
   shutting down the furnace based on the determined flue gas temperature exceeding the maximum temperature threshold or staying below the minimum temperature threshold.

4. The method of claim 1, wherein
   adjusting the at least one operation characteristic includes shutting down the furnace; and
   the method includes providing an indication of a need for service of the furnace based on shutting down the furnace.

5. The method of claim 4, comprising providing an indication of an expected problem with at least one component of the furnace, wherein the indication of the expected problem is based on the furnace operating condition and the determined difference.

6. The method of claim 1, wherein the method includes:
   measuring a flue gas temperature using a temperature sensor that is associated with a furnace component housing that is upstream from a flue gas exhaust vent.

7. The method of claim 6, wherein the temperature sensor is either: (i) exposed to the flue gas to directly sense the flue gas temperature; or (ii) situated to sense a temperature of a portion of the furnace component housing that is exposed to the flue gas, where the temperature of the portion corresponds to the flue gas temperature.

8. The method of claim 1, wherein adjusting the at least one operation characteristic of the furnace includes at least one of:

reducing an input level of fuel to a burner of the furnace, increasing a fan speed of a blower of the furnace, shutting off the furnace and recycling a startup procedure, or shutting down the furnace.

9. The method of claim 1, wherein, when the determined rate exceeds the predetermined acceptable rate and the determined difference exceeds the rate difference threshold, adjusting the at least one operation characteristic includes at least one of reducing an input level of fuel supplied to the burner, increasing a speed of a blower fan, or shutting down the furnace.

10. The method of claim 6, wherein the furnace component housing comprises an induced draft combustion exhaust blower, and including positioning the temperature sensor to indirectly sense the flue gas temperature of the flue gas by sensing a temperature of a portion of the induced draft combustion exhaust blower, or positioning the temperature sensor within the induced draft combustion exhaust blower to directly expose the temperature sensor to the flue gas to sense the flue gas temperature.

11. The method of claim 6, wherein the temperature sensor is a single temperature sensor that detects the flue gas temperature and adjusts the at least one operation characteristic of the furnace.

12. A furnace configured for heating a space to be occupied by at least one individual, the furnace comprising:
a burner;
a heat exchanger situated near the burner;
a blower configured to direct fluid flow across the heat exchanger;
a vent configured to direct flue gas away from the furnace;
a temperature sensor situated to sense a temperature of the flue gas, wherein the temperature sensor is associated with a furnace component housing that is upstream from the vent;
a controller that receives an indication of the temperature of the flue gas from the temperature sensor, the controller being configured to
determine a rate of change of the flue gas;
determine a difference between a determined rate of change and a predetermined acceptable rate for a current furnace operating condition; and
adjust at least one operation characteristic of the furnace based on a determined difference satisfying at least one predetermined criterion; and
wherein:
the current furnace operating condition is a startup procedure that includes turning on the burner;
the predetermined acceptable rate comprises an increase in the flue gas temperature over time;
the at least one predetermined criterion includes a rate difference threshold;
when the determined rate is below the predetermined acceptable rate and the determined difference exceeds the rate difference threshold, the controller is configured to adjust the at least one operation characteristic by at least temporarily shutting down the furnace followed by automatically recycling the startup procedure; and
at least temporarily shutting down the furnace followed by automatically recycling the startup procedure comprises performing the shutting down and recycling the startup procedure up to a predetermined acceptable number of times and subsequently preventing operation of the furnace based on the determined rate remaining below the predetermined acceptable rate and the determined difference repeatedly exceeding the rate difference threshold each of the number of times.

13. The furnace of claim 12, wherein the furnace component housing comprises a combustion exhaust housing, and wherein the temperature sensor is either: (i) exposed to the flue gas to directly sense a flue gas temperature; or (ii) situated to sense a temperature of a portion of a combustion exhaust housing of the furnace that is exposed to the flue gas, where the temperature of the portion of the combustion exhaust housing corresponds to the flue gas temperature.

14. The furnace of claim 12, wherein the controller is configured to adjust the at least one operation characteristic of the furnace by at least one of: reducing an input level of fuel to the burner, increasing a fan speed of the blower, shutting off the furnace and recycling a startup procedure, or shutting down the furnace.

15. The furnace of claim 12, wherein,
and
when the determined rate exceeds the predetermined acceptable rate and the determined difference exceeds the rate difference threshold, the controller is configured to adjust the at least one operation characteristic by at least one of reducing an input level of fuel supplied to the burner, increasing a fan speed of the blower, or shutting down the furnace.

16. The furnace of claim 12, wherein the controller is configured to
determine the flue gas temperature based on the indication from the temperature sensor;
determine whether the determined flue gas temperature is below a minimum temperature threshold or exceeds a maximum temperature threshold for a heating cycle; and
shut down the furnace based on the determined flue gas temperature exceeding the maximum temperature threshold or staying below the minimum temperature threshold.

17. The furnace of claim 12, wherein the controller is configured to
adjust the at least one operation characteristic by shutting down the furnace; and
provide an indication of a need for service of the furnace based on shutting down the furnace.

18. The furnace of claim 17, wherein the controller is configured to
determine that there is an expected problem with at least one of the burner, the blower, or the heat exchanger based on the furnace operating condition and the determined difference; and
provide an indication of the expected problem.

19. The furnace of claim 12, wherein the furnace component housing comprises an induced draft combustion exhaust blower, and wherein the temperature sensor is positioned to indirectly sense the temperature of the flue gas by sensing a temperature of a portion of the induced draft combustion exhaust blower, or the temperature sensor is situated within the induced draft combustion exhaust blower and is exposed directly to the flue gas to sense the temperature of the flue gas.

20. The furnace of claim 12, wherein the temperature sensor is a single temperature sensor that detects a flue gas temperature and adjusts the at least one operation characteristic of the furnace.

* * * * *